US011072186B2

(12) United States Patent
Akahane

(10) Patent No.: US 11,072,186 B2
(45) Date of Patent: Jul. 27, 2021

(54) RECORDING APPARATUS

(71) Applicant: SEIKO EPSON CORPORATION, Tokyo (JP)

(72) Inventor: Hisayuki Akahane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/795,824

(22) Filed: Feb. 20, 2020

(65) Prior Publication Data

US 2020/0269594 A1 Aug. 27, 2020

(30) Foreign Application Priority Data

Feb. 22, 2019 (JP) .............................. JP2019-030501

(51) Int. Cl.
*B41J 29/02* (2006.01)
*B41J 29/13* (2006.01)
*H04N 1/00* (2006.01)
*B41J 2/175* (2006.01)

(52) U.S. Cl.
CPC ......... *B41J 2/17566* (2013.01); *B41J 2/1752* (2013.01); *B41J 29/02* (2013.01); *B41J 29/13* (2013.01); *H04N 1/00519* (2013.01); *H04N 1/00525* (2013.01); *H04N 1/00554* (2013.01); *H04N 1/00557* (2013.01); *H04N 1/00559* (2013.01)

(58) Field of Classification Search
CPC ...... B41J 2/175; B41J 2/17509; B41J 2/1752; B41J 2/17536; B41J 2/17566; B41J 29/02; B41J 2002/17573; G03G 21/16; H04N 1/00519; H04N 1/00525; H04N 1/00554; H04N 1/00557; H04N 1/00559
See application file for complete search history.

(56) References Cited

U.S. PATENT DOCUMENTS

| 2002/0118403 | A1* | 8/2002 | Kameyama | ........ H04N 1/00554 358/474 |
| 2006/0088336 | A1* | 4/2006 | Hirose | ................... G03G 15/60 399/110 |
| 2011/0075128 | A1 | 3/2011 | Lechocinski et al. | |
| 2013/0188209 | A1 | 6/2013 | Horikawa et al. | |
| 2014/0104659 | A1 | 4/2014 | Nishikawa | |
| 2014/0168680 | A1 | 6/2014 | Shiomi | |
| 2015/0009512 | A1 | 1/2015 | Nishikawa | |
| 2016/0072974 | A1 | 3/2016 | Nishikawa | |
| 2017/0006175 | A1 | 1/2017 | Nishikawa | |

(Continued)

FOREIGN PATENT DOCUMENTS

| CN | 102035971 | 4/2011 |
| CN | 103095949 | 5/2013 |

(Continued)

*Primary Examiner* — Anh T Vo
(74) *Attorney, Agent, or Firm* — Workman Nydegger

(57) ABSTRACT

A printer includes a restrictor that is configured to switch between a restricted state that restricts a scanner unit from pivoting in an opening direction from a closed state in which the scanner unit is closed with respect to the casing, and a free state that allows the scanner unit to pivot in the opening direction from the closed state, and that enters the restricted state when the panel unit is set to a first orientation and enters the free state when the panel unit in the first orientation pivots by a predetermined angle to be in a second orientation.

10 Claims, 19 Drawing Sheets

(56) References Cited

U.S. PATENT DOCUMENTS

| | | |
|---|---|---|
| 2017/0289374 A1 | 10/2017 | Nishikawa |
| 2018/0097948 A1 | 4/2018 | Namba |
| 2018/0227447 A1 | 8/2018 | Nishikawa |

FOREIGN PATENT DOCUMENTS

| | | |
|---|---|---|
| JP | 2013-150247 A | 8/2013 |
| JP | 2014-120864 A | 6/2014 |
| JP | 2018-052003 A | 4/2018 |

* cited by examiner

RECORDING APPARATUS

The present application is based on, and claims priority from JP Application Serial Number 2019-030501, filed Feb. 22, 2019, the disclosure of which is hereby incorporated by reference herein in its entirety.

BACKGROUND

1. Technical Field

The present disclosure relates to a recording apparatus having both a recording function for recording on a medium and a reading function for reading a document.

2. Related Art

Some recording apparatuses typified by a printer are provided with a scanner unit on an upper portion of an apparatus main body having a recording portion that records on a medium, and are configured as a multifunctional peripheral having both a recording function for recording on a medium and a reading function for reading a document. Some such recording apparatuses, as illustrated in JP-A-2018-052003 as an example, include an operation panel having a display portion that displays predetermined information and a button portion that allows input of predetermined information, and are configured such that the operation panel can be tilted so that the user can easily operate the operation panel. The operation panel described in JP-A-2018-052003 is provided on a side surface of the apparatus, and a pivot shaft is provided along the upper side of the rectangular operation panel. The operation panel is configured to be in a tilted orientation by causing the operation surface to pivot so as to face upward.

In addition, as exemplified in JP-A-2014-120864, in a recording apparatus configured as a multifunctional peripheral, a scanner unit may be configured to pivot so as to open and close an upper portion of an apparatus main body, and the inside of the apparatus main body may be exposed by opening the scanner unit so that maintenance or the like can be performed. The multifunctional peripheral described in JP-A-2014-120864 includes an operation panel on a free end side of the scanner unit that pivots with respect to the apparatus main body. When the scanner unit is pivoted, the operation panel is displaced together with the scanner unit.

As in JP-A-2014-120864, when the operation panel, which is provided on the free end side of the scanner unit that pivots with respect to the apparatus main body, is configured to tilt by causing the operation surface to pivot so as to face upward similarly to the operation panel of JP-A-2018-052003, the scanner unit may unintentionally pivot before the operation panel, or the scanner unit may pivot together with the operation panel due to the force for pivoting the operation panel upward.

SUMMARY

According to an aspect of the present disclosure, a recording apparatus includes a recording portion that records on a medium, a casing provided with the recording portion in the casing, a scanner unit provided so as to pivot with respect to the casing and configured to open and close an upper portion of the casing by pivoting, a panel unit that is provided on the scanner unit, and that, when the scanner unit is in a closed state in which the scanner unit is closed with respect to the casing, is configured to pivot from a first orientation where a panel surface is along a side surface of the casing toward a direction in which the panel surface faces upward compared with the first orientation, and at least one restrictor that is configured to switch between a restricted state that restricts the scanner unit from pivoting in an opening direction from the closed state in which the scanner unit is closed with respect to the casing, and a free state that allows the scanner unit to pivot in the opening direction from the closed state, and that enters the restricted state when the panel unit is set to the first orientation and enters the free state when the panel unit in the first orientation pivots by a predetermined angle to be in a second orientation.

DESCRIPTION OF EXEMPLARY EMBODIMENTS

Figure 1:
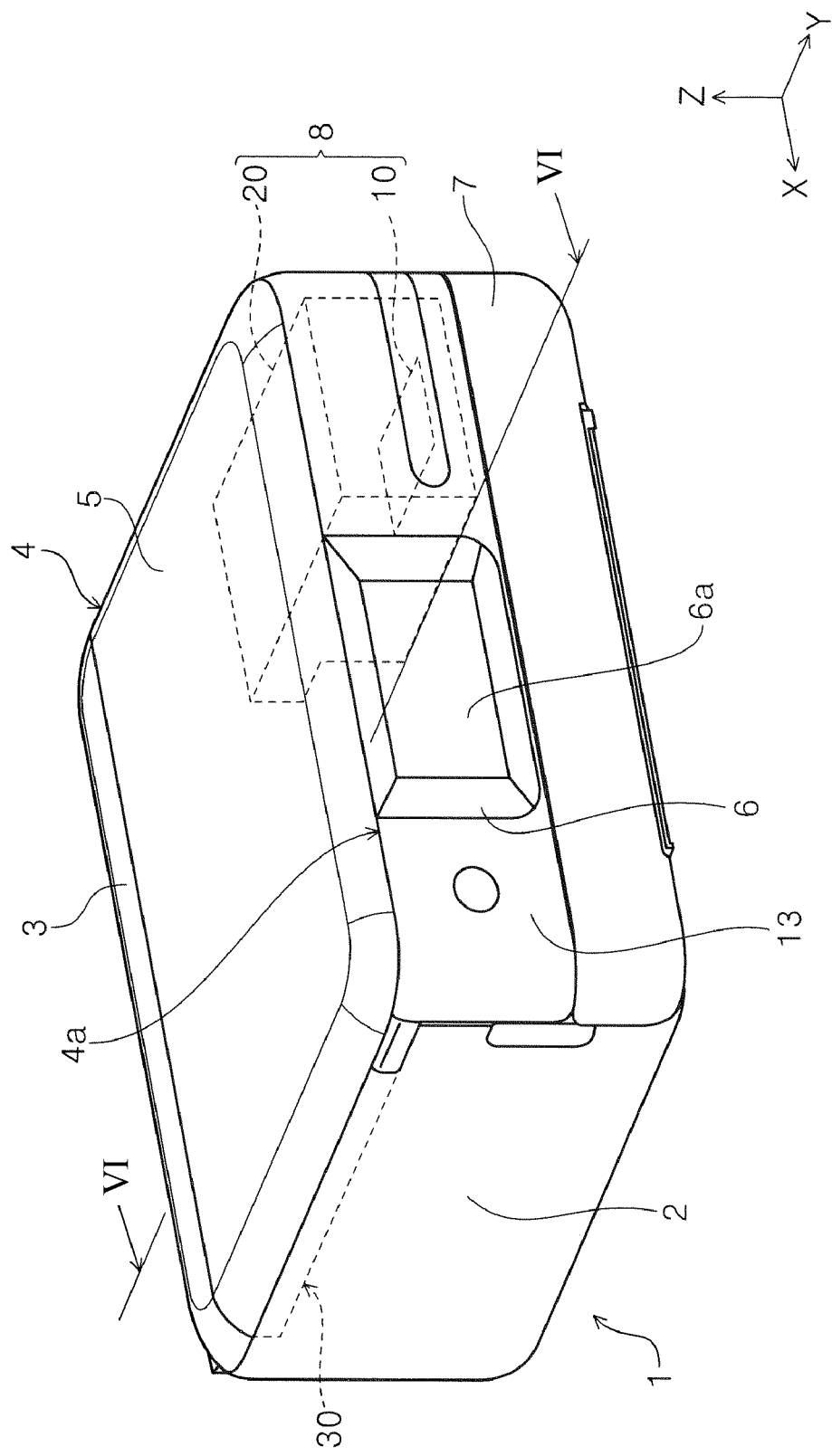
FIG. 1 is an external perspective view of a printer according to a first embodiment.

Hereinafter, the present disclosure will be schematically described.

According to a first aspect of the present disclosure, a recording apparatus includes a recording portion that records on a medium, a casing provided with the recording portion in the casing, a scanner unit provided so as to pivot with respect to the casing and configured to open and close an upper portion of the casing by pivoting, a panel unit that is provided on the scanner unit, and that, when the scanner unit is in a closed state in which the scanner unit is closed with respect to the casing, is configured to pivot from a first orientation where a panel surface is along a side surface of the casing toward a direction in which the panel surface faces upward compared with the first orientation, and at least one restrictor that is configured to switch between a restricted state that restricts the scanner unit from pivoting in an opening direction from the closed state in which the scanner unit is closed with respect to the casing, and a free state that allows the scanner unit to pivot in the opening direction from the closed state, and that enters the restricted state when the panel unit is set to the first orientation and enters the free state when the panel unit in the first orientation pivots by a predetermined angle to be in a second orientation.

According to this aspect, because the recording apparatus is provided with a restrictor that enters the restricted state when the panel unit is set to the first orientation, and enters the free state when the panel unit in the first orientation pivots by a predetermined angle to be in the second orientation, until the panel unit is changed from the first orientation to the second orientation, it is possible to prevent the scanner unit from being pivoted first with a force for pivoting the panel unit upward. In addition, the scanner unit can be easily pivoted when the user holds the panel unit in a state in which the panel unit is in the second orientation.

In a second aspect according to the first aspect, the panel unit is provided at a free end of the scanner unit.

According to this aspect, because the panel unit is provided at the free end of the scanner unit, a recording apparatus with good operability can be obtained because the pivot direction of the scanner unit and the pivot direction of the panel unit are the same.

When the panel unit is provided at the free end of the scanner unit, the scanner unit can be easily opened by a force for moving the panel unit from the first orientation to the second orientation; however, due to the same effect as the first aspect, it is possible to reliably reduce the likelihood of the scanner unit being pivoted by a force for pivoting the panel unit.

In a third aspect according to the second aspect, the panel unit is configured to pivot until the panel unit takes a third orientation in which a pivot angle from the first orientation is larger than a pivot angle of the second orientation from the first orientation, and in a state in which the panel unit is in the third orientation when a direction in which the free end of the scanner unit is positioned is treated as an apparatus front side, and, in a case where the scanner unit is set to a maximum opening angle, the panel surface faces toward the apparatus front side so as to be tilted from horizontal.

According to this aspect, when the scanner unit is completely open, the panel surface can be easily viewed from the apparatus front side.

In a fourth aspect according to any one of the first to third aspects, the restrictor includes a hook portion that is provided in the panel unit and that becomes displaced with pivoting of the panel unit, and a restricting portion that is provided in the casing and that restricts pivoting of the scanner unit relative to the casing by engaging with the hook portion, and before the panel unit is changed from the first orientation to the second orientation, the hook portion is engaged with the restricting portion and the restrictor enters the restricted state, and when the panel unit is in the second orientation, the hook portion is disengaged from the restricting portion, and the restrictor enters the free state.

According to this aspect, the restrictor can be formed with a simple configuration.

In a fifth aspect according to a fourth aspect, the hook portion includes a projecting portion that interferes with the restricting portion when the hook portion is disengaged from the restricting portion.

According to this aspect, because the hook portion includes the projecting portion that interferes with the restricting portion when the hook portion is disengaged from the restricting portion, a click feeling can be obtained when the restriction on the pivoting of the scanner unit is released, and the user can easily understand that the scanner unit can be pivoted.

In a sixth aspect according to the fourth aspect or the fifth aspect, the recording apparatus further includes a presser that is provided on the restricting portion, and that presses against the hook portion engaged with the restricting portion.

According to this aspect, because the recording apparatus further includes the presser that is provided on the restricting portion, and that presses against the hook portion engaged with the restricting portion, it is possible to suppress rattling of the panel unit in a state in which the hook portion is engaged with the restricting portion.

In a seventh aspect according to any one of the first to sixth aspects, the restrictor is provided in a plurality.

According to this aspect, because the restrictor is provided in a plurality, until the panel unit is changed from the first orientation to the second orientation, it is possible to more reliably suppress the scanner unit from being pivoted first with a force for pivoting the panel unit upward.

In an eighth aspect according to any one of the first to seventh aspects, the recording portion includes a recording head that ejects liquid, and is configured to perform recording by ejecting the liquid from the recording head toward the medium, the casing is provided with, in the casing, a liquid housing portion that houses the liquid, and, in a state in which the scanner unit is open, the liquid housing portion is configured to be replenished with the liquid.

According to this aspect, the same effect as any one of the first to seventh aspects can be obtained, and the scanner unit can be opened with good operability when the liquid housing portion is to be replenished with the liquid.

In a ninth aspect according to the eighth aspect, the recording portion is provided with a carriage that supports the recording head and that is configured to mount the liquid housing portion.

According to this aspect, in the recording apparatus in which the liquid housing portion is mounted on the carriage that supports the recording head, the same effect as the eighth aspect can be obtained.

First Embodiment

Hereinafter, an outline of a recording apparatus according to an embodiment of the present disclosure will be described with reference to the drawings. In the present embodiment, an ink jet printer 1 is given as an example of a recording apparatus. Hereinafter, the ink jet printer 1 is simply referred to as a printer 1.

Further, in the XYZ coordinate system illustrated in each figure, the X-axis direction indicates the apparatus width direction, the Y-axis direction indicates the apparatus depth direction, and the Z-axis direction indicates the apparatus height direction. In addition, the +Y direction corresponds to the apparatus front side, and the −Y direction corresponds to the apparatus rear side. In addition, when viewed from the apparatus front side, the left is the +X direction and the right is the −X direction. In addition, the +Z direction is the upper side, and the −Z direction side is the lower side.

In addition, the transport direction in which the medium is transported in the printer 1 is referred to as "downstream", and the opposite direction is referred to as "upstream".

Printer Outline

The printer 1 illustrated in FIG. 1 includes a casing 2 that is provided therein with a recording portion 8 that records on a medium, and a scanner unit 4 that is provided in a top portion of the casing 2 and that reads an image of a document. That is, the printer 1 is configured as a multi-functional peripheral having an image reading function in addition to a recording function.

In the printer 1, examples of the medium on which recording is performed include plain paper, thick paper used for postcards and business cards, which is thicker than plain paper, thin paper thinner than plain paper, glossy paper for photography, and the like. In addition, the printer 1 is also configured to record on a label surface of a disk-type memory such as a CD or a DVD.

In the printer 1, the recording portion 8 includes a recording head 10 that ejects ink as a liquid and a carriage 20 that supports the recording head 10, and the recording portion 8 is configured to perform recording by ejecting ink from the recording head 10 toward a medium P.

Figure 3:
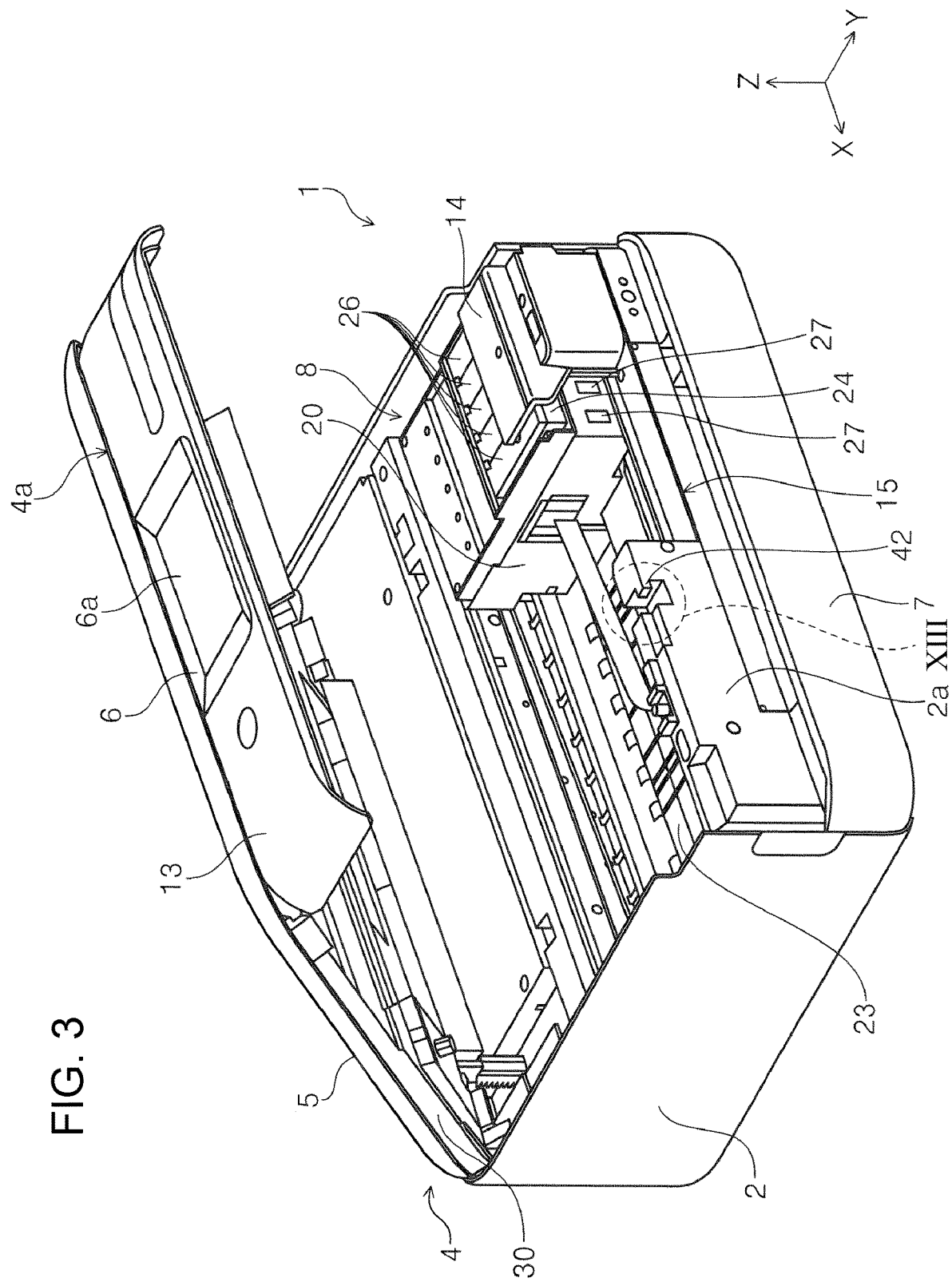
FIG. 3 is a perspective view illustrating a state in which a scanner unit of the printer according to the first embodiment has been completely opened.

The scanner unit 4 is provided so as to pivot with respect to the casing 2, and is configured to be capable of opening and closing an upper portion of the casing 2 by pivoting. FIG. 1 illustrates a closed state in which the scanner unit 4 is closed with respect to the casing 2, and FIG. 3 illustrates a state in which the scanner unit 4 is completely open with respect to the casing 2.

A panel unit 13 including an operation portion 6 is provided in the +Y direction, which is a direction toward the apparatus front side of the printer 1. The operation portion 6 can perform preview display of setting contents, images, and the like in addition to various setting operations and execution operations for recording and image reading.

Figure 2:
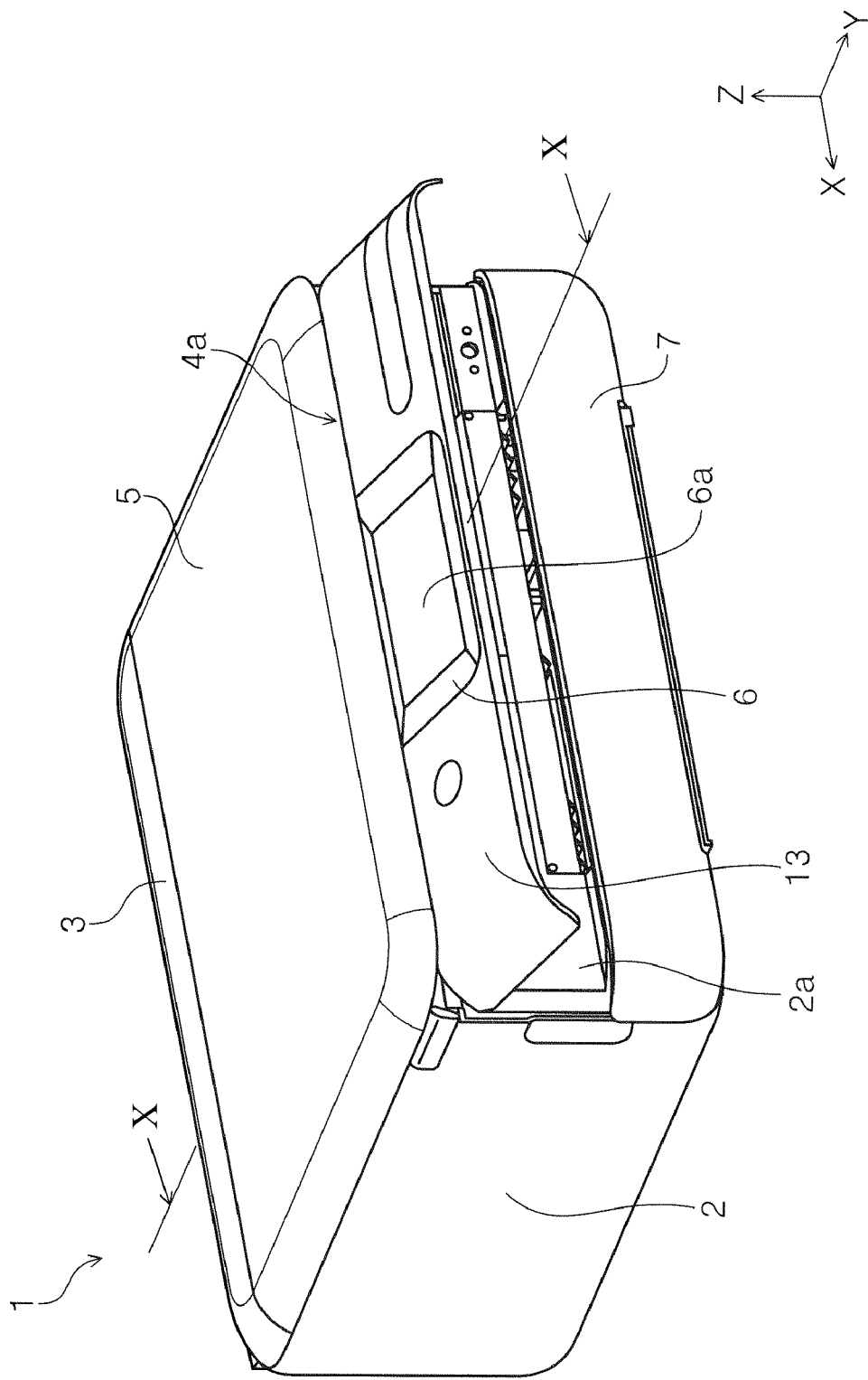
FIG. 2 is a perspective view illustrating a state in which a panel unit of the printer according to the first embodiment is in a third orientation.

The panel unit 13 is provided in the scanner unit 4 and, as illustrated in FIG. 1, from a state in which an operation surface 6*a*, serving as a panel surface, faces forward, as illustrated in FIG. 2, the operation surface 6*a* is configured to pivot in a direction facing upward from the state in FIG. 1.

The configuration of the scanner unit 4 and the panel unit 13 will be described in detail later.

A lower cover 7 is provided below a front surface 2*a* of the casing 2. Further, the front surface 2*a* of the casing 2 is not visible in FIG. 1, but is illustrated in FIGS. 2 and 3.

Figure 4:
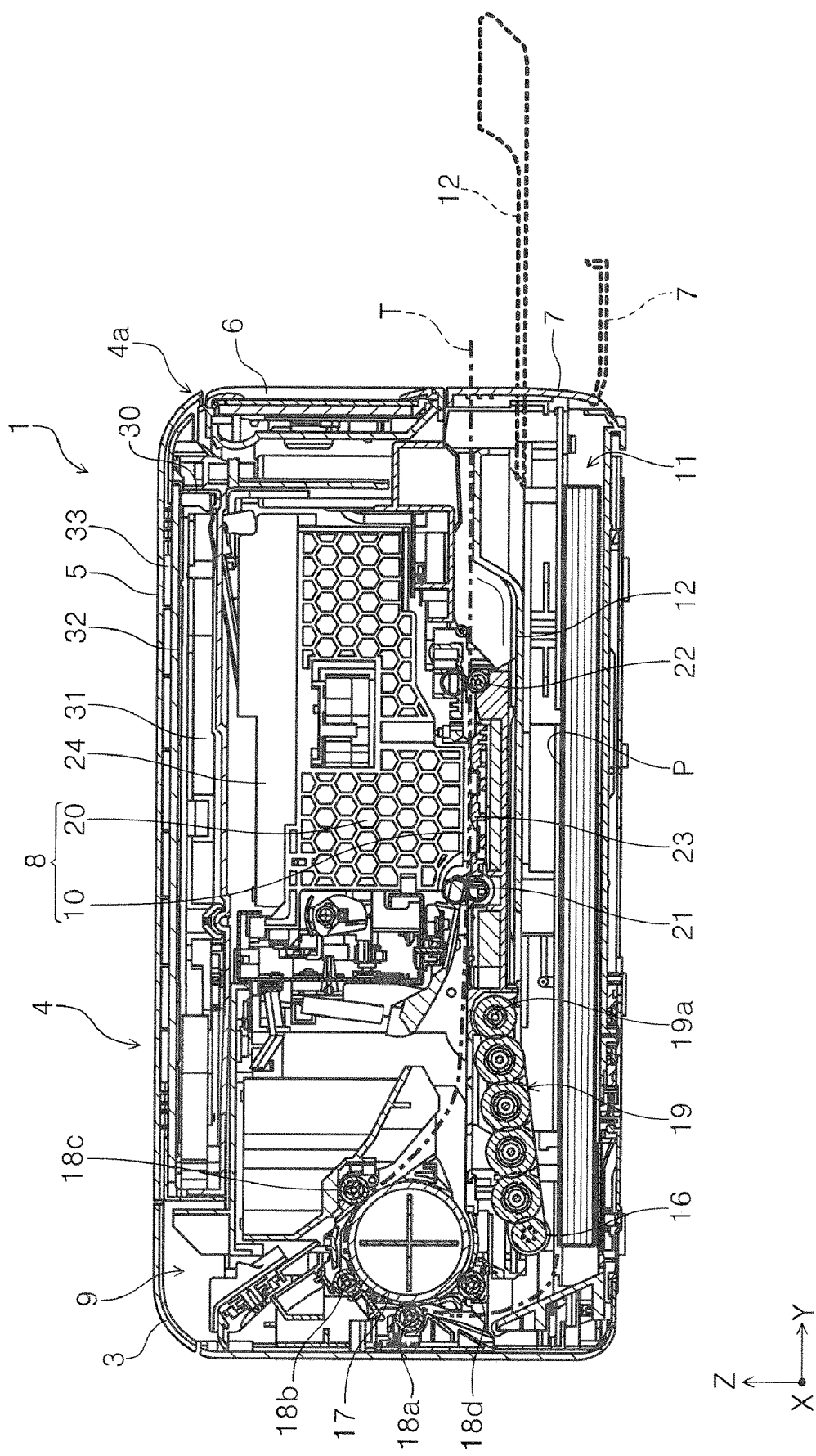
FIG. 4 is a side sectional view of the printer according to the first embodiment.

A media tray 11 that stores the medium P before recording and a discharge tray 12 that receives the medium discharged after recording are configured so as to be exposed by opening the lower cover 7 as illustrated by a dotted line in FIG. 4.

The discharge tray 12 is configured to switch between a stored state in which the discharge tray 12 is stored in the casing 2 as indicated by a solid line in FIG. 4, and a protruding state in which the discharge tray 12 protrudes toward the front side of the casing 2 as indicated by a dotted line in FIG. 4, and can, in the protruding state, receive the medium after recording. The discharge tray 12 is configured to switch between the stored state and the protruding state by a motor (not illustrated).

The media tray 11 can house a plurality of media P and is detachable from the casing 2. As illustrated in FIG. 4, in a state in which the media tray 11 is mounted in the casing 2, the media tray 11 is configured such that the medium P can be sent out to a medium transport path T described later. In addition, the media tray 11, in a state in which the media tray 11 is pulled toward the apparatus front side (+Y direction), can be replenished with media P.

Medium Transport Path in Printer

Next, the medium transport path T in the printer 1 will be described with reference to FIG. 4.

The medium transport path T is a transport path for the medium P that is transported from the media tray 11 provided in the lower portion of the printer 1 toward a recording area of the recording portion 8.

The medium P set on the media tray 11 is picked up by a feeding roller 16 and sent out to the medium transport path T. More specifically, the feeding roller 16 that is driven to rotate by a drive source (not illustrated) is provided on a roller support member 19 that swings around a swing shaft 19*a*, and by rotating in contact with the uppermost one of the plurality of media P housed in the media tray 11, the uppermost medium P is sent from the media tray 11 toward the apparatus rear side (−Y direction).

An intermediate roller 17 that is driven to rotate by a drive source (not illustrated) is provided downstream of the feeding roller 16, and the medium P is curved and inverted by the intermediate roller 17, and is fed toward the apparatus front side (+Y direction). Further, reference numerals 18*a*, 18*b*, 18*c*, and 18*d* correspond to driven rollers that can be driven and rotated by the intermediate roller 17. The medium is nipped by the driven roller 18*a* and the intermediate roller 17, nipped by the driven roller 18*b* and the intermediate roller 17, and nipped by the driven roller 18*c* and the intermediate roller 17, and then sent downstream. The driven roller 18*d* will be described later.

A transport roller pair 21 is provided downstream of the intermediate roller 17, and the medium is sent below the recording head 10 by the transport roller pair 21. In the transport roller pair 21, in FIG. 4, a lower roller is rotationally driven by a drive source (not illustrated), and an upper roller is driven to rotate by the lower roller.

The recording portion 8 is provided downstream of the transport roller pair 21. In the recording portion 8, the recording head 10 that ejects ink is provided at the bottom of the carriage 20. A liquid housing portion 24 that houses ink to be supplied to the recording head 10 is mounted on the carriage 20. In other words, the casing 2 includes the liquid housing portion 24 therein.

The carriage 20 can be reciprocated in the apparatus width direction (X-axis direction) by a drive source (not illustrated).

A medium support member 23 that supports a medium transported along the medium transport path T is provided at a position facing the recording head 10. The medium support member 23 defines a space between the medium and the recording head 10. The space between the medium and the recording head 10 is also called a gap.

A discharge roller pair 22 is provided downstream of the medium support member 23. Similarly to the transport roller pair 21, the discharge roller pair 22 is configured such that the lower roller is rotationally driven by a drive source (not illustrated) and the upper roller is driven to rotate by the lower roller. The medium P after being recorded on by the recording portion 8 is discharged by the discharge roller pair 22 toward the discharge tray 12 which is in the protruding state as illustrated by a dotted line in FIG. 4.

Further, the printer 1 is configured to perform double-sided recording in which recording is performed on a first surface of the medium P and a second surface of the medium P opposite to the first surface. When performing double-sided recording, after recording on the first side, the medium P is switched back and sent in the −Y direction. The switched-back medium P can be nipped by the driven roller 18d and the intermediate roller 17 and made to join the medium transport path T. The medium P is inverted by the intermediate roller 17, is transported below the recording head 10 with the second surface facing the recording head 10, and recording is performed on the second surface.

In addition, the printer 1 is configured to supply the medium P on which recording is to be performed from an upper supply port 9 provided at an apparatus-rear-side upper portion. The upper supply port 9 is opened by opening a feeding port cover 3. The medium P supplied from the upper supply port 9 enters the medium transport path T from upstream of the transport roller pair 21 and recording by the recording head 10 is performed thereon.

Scanner Unit

In addition, in the printer 1, the scanner unit 4 is provided so as to pivot with respect to the upper portion of the casing 2 as illustrated in FIG. 3. In addition, the scanner unit 4 has a pivot shaft on the apparatus rear side, that is, on the −Y direction side, and is configured to allow the upper portion of the casing 2 to be opened and closed by causing the apparatus front side, that is, the +Y direction side to pivot as a free end 4a.

Figure 5:
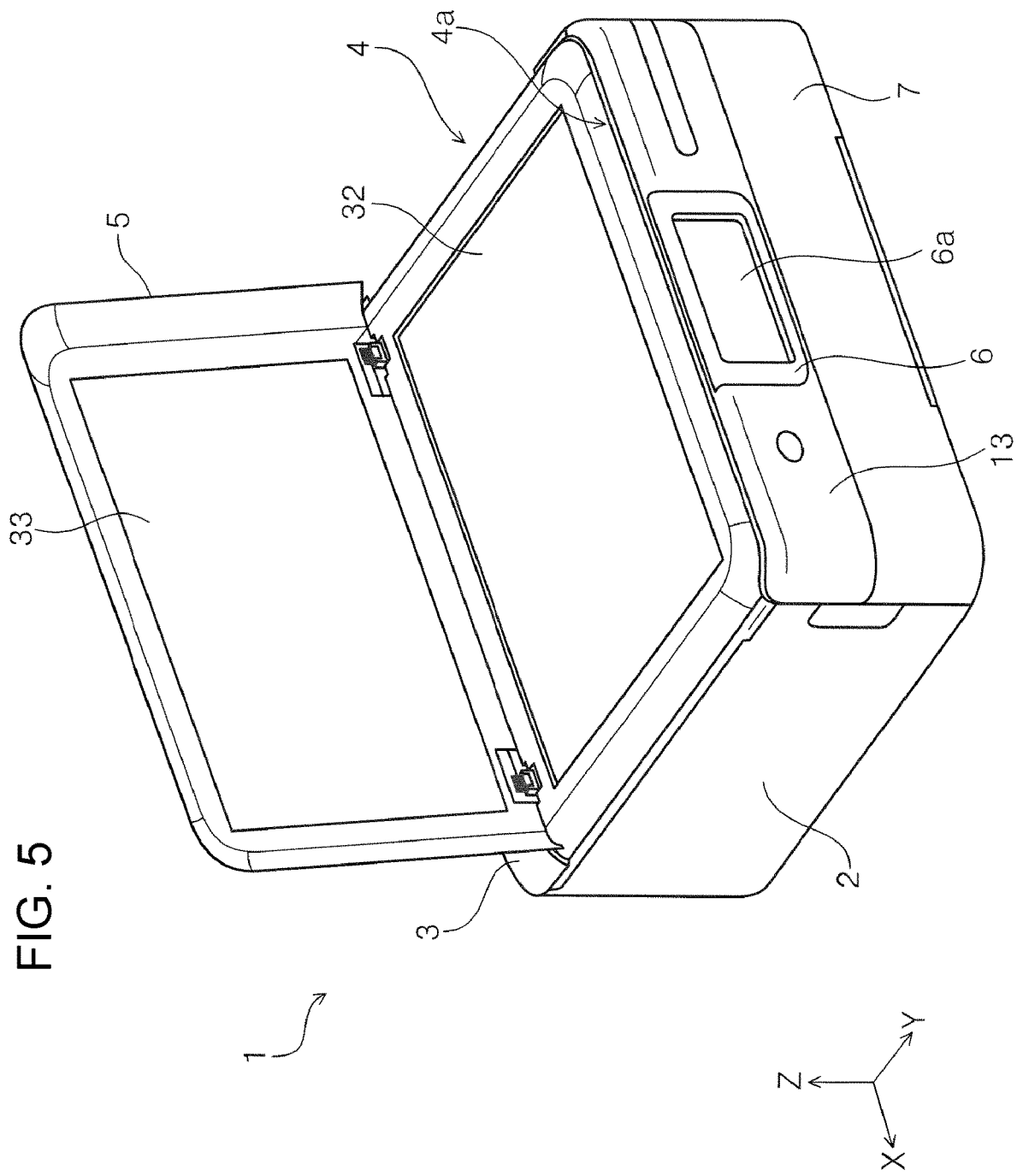
FIG. 5 is a perspective view illustrating a state in which a document table cover of the scanner unit of the printer according to the first embodiment has been opened.

As illustrated in FIG. 4, the scanner unit 4 includes a scanner main body 30 including a reading portion 31 therein, and a document table cover 5 that can open and close a document table 32 provided on the scanner main body 30. When the document table cover 5 is opened as illustrated in FIG. 5, the document table 32 is exposed. The reading portion 31 reads a document placed on the document table 32. The document is placed on the document table 32 with the reading surface facing the document table 32.

As illustrated in FIG. 5, a holding plate 33 that holds the document is provided on the surface of the document table cover 5 that faces the document table 32 when the document table cover 5 is closed.

Further, the panel unit 13 is provided in the scanner main body 30, and the document table cover 5 can be opened and closed by itself.

Panel Unit

The panel unit 13, as described above, is provided on the scanner main body 30 of the scanner unit 4 so as to pivot. More specifically, as illustrated in FIG. 1, from the first orientation where the operation surface 6a is along the front side surface of the casing 2, that is, the front surface 2a (refer to FIG. 2), as illustrated in FIG. 2, the operation surface 6a is configured to pivot in a direction facing upward from the first orientation.

In addition, in the printer 1, the panel unit 13 is provided at the free end 4a of the scanner unit 4. Accordingly, the pivot direction of the scanner unit 4 and the pivot direction of the panel unit 13 are the same, and the operability of the printer 1 in a state in which the user views the panel unit 13 from the front is improved.

Here, when the panel unit 13 such as that described above is provided in the scanner main body 30, the scanner unit 4 may unintentionally open first due to the force of pivoting the panel unit 13 upward from the first orientation illustrated in FIG. 1. In particular, when the panel unit 13 is provided at the free end 4a of the scanner unit 4, the scanner unit 4 can be easily opened by a force that pivots the panel unit 13 upward. Further, even when the panel unit 13 is provided not on the free end 4a of the scanner unit 4 but on a +X direction or −X direction side of the scanner unit 4, the scanner unit 4 may be opened unintentionally when the panel unit 13 is pivoted.

In order to avoid this, the printer 1 according to this embodiment includes a restrictor 40 that is configured to switch between a restricted state that restricts the scanner unit 4 from pivoting in the opening direction from a closed state in which the scanner unit 4 is closed with respect to the casing 2, and a free state that allows the scanner unit 4 to pivot in the opening direction from the closed state.

In the present embodiment, the restrictor 40 is configured to be in the restricted state by setting the panel unit 13 to the first orientation (refer to FIG. 6), and to be in the free state by setting the panel unit 13 to the second orientation (refer to FIG. 9) in which the panel unit 13 is pivoted by a predetermined angle from the first orientation.

Hereinafter, a more specific configuration of the restrictor 40 will be described with reference to FIGS. 6 to 12.

Figure 9:
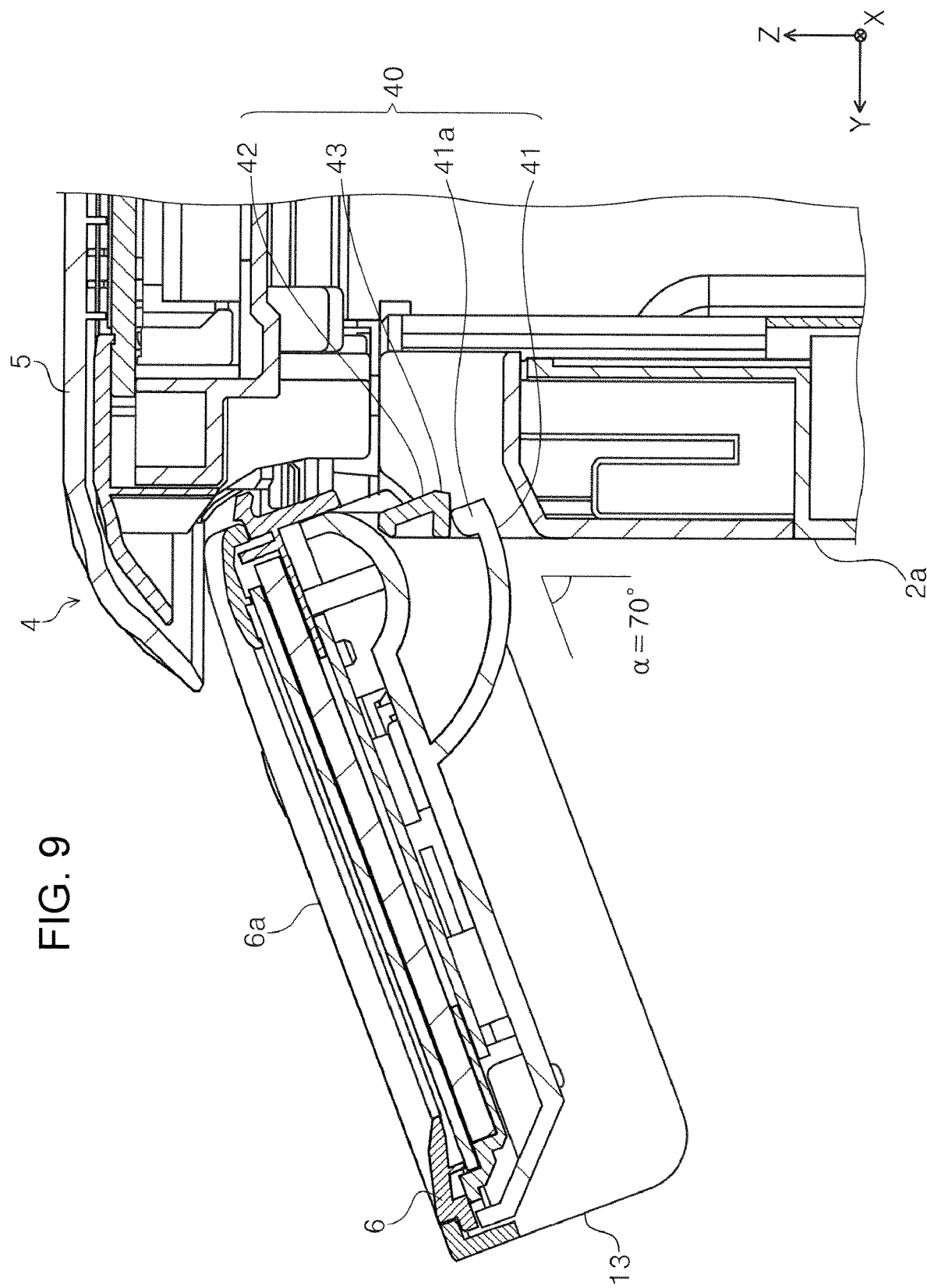
FIG. 9 is a sectional view illustrating a state in which the panel unit has been pivoted by 70° from the first orientation.
Figure 10:
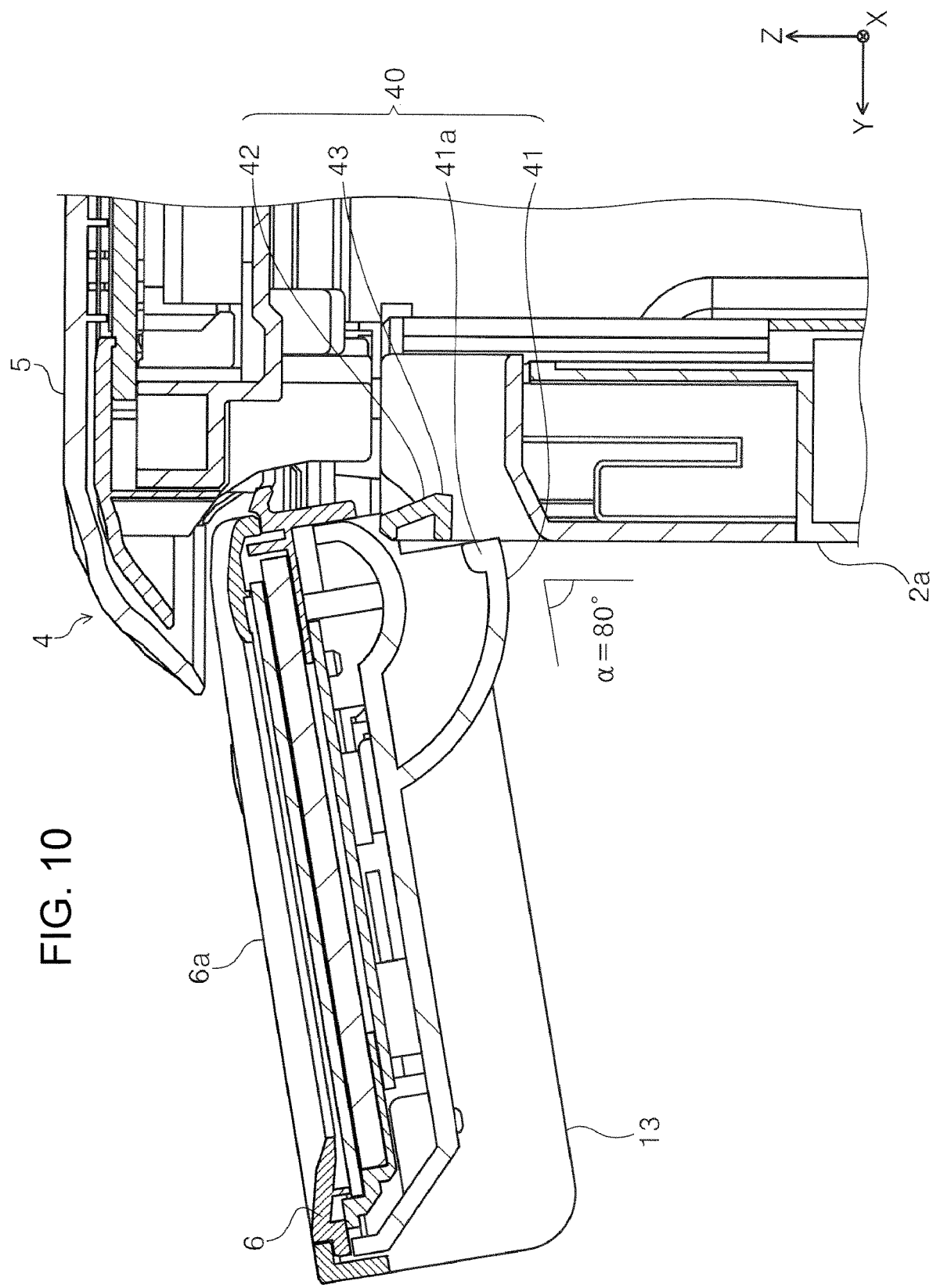
FIG. 10 is a sectional view taken along the line X-X in FIG. 2, illustrating a state in which the panel unit has been pivoted by 80° from the first orientation.
Figure 11:
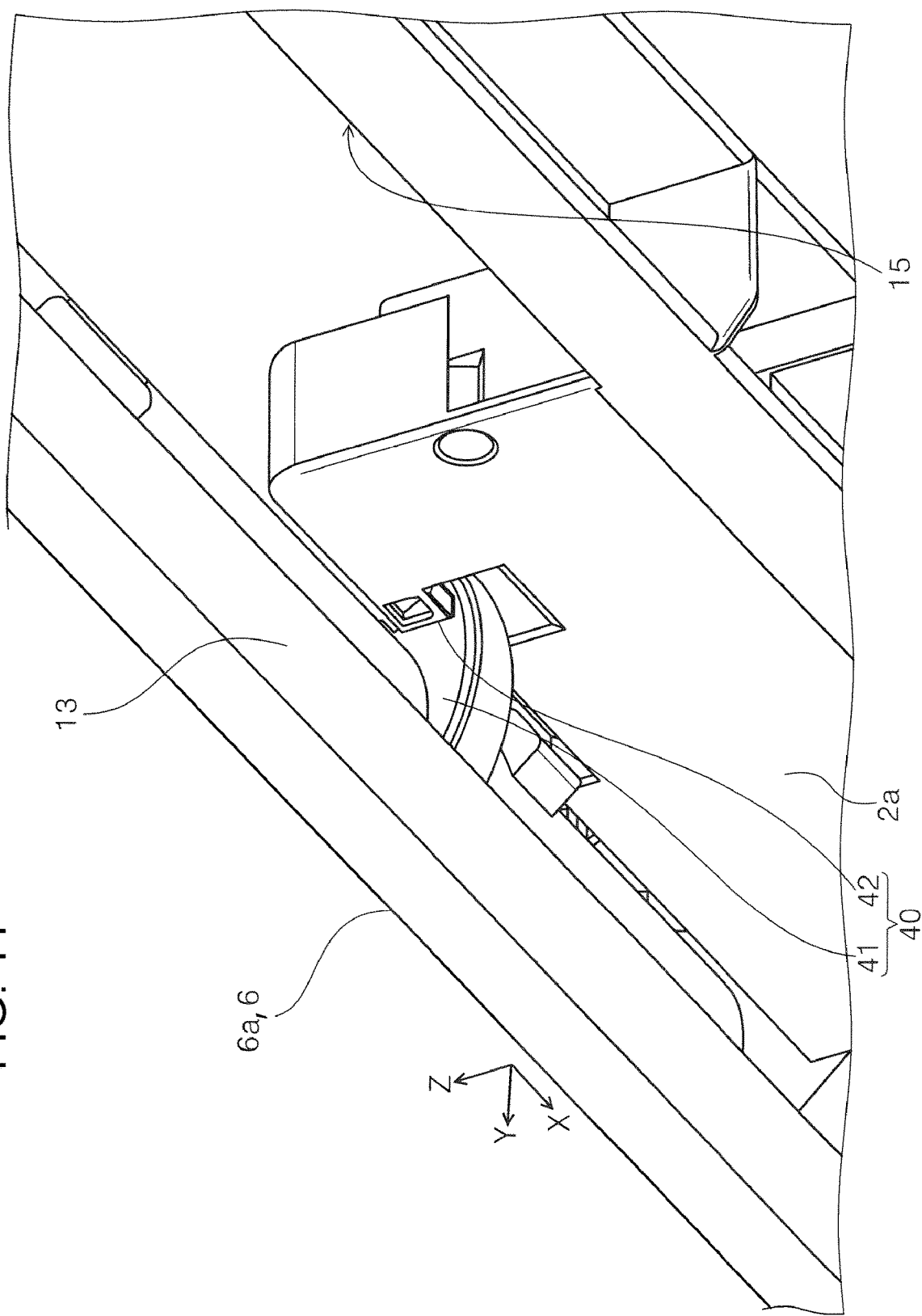
FIG. 11 is a perspective view of the panel unit in the state illustrated in FIG. 7 as viewed from below.
Figure 12:
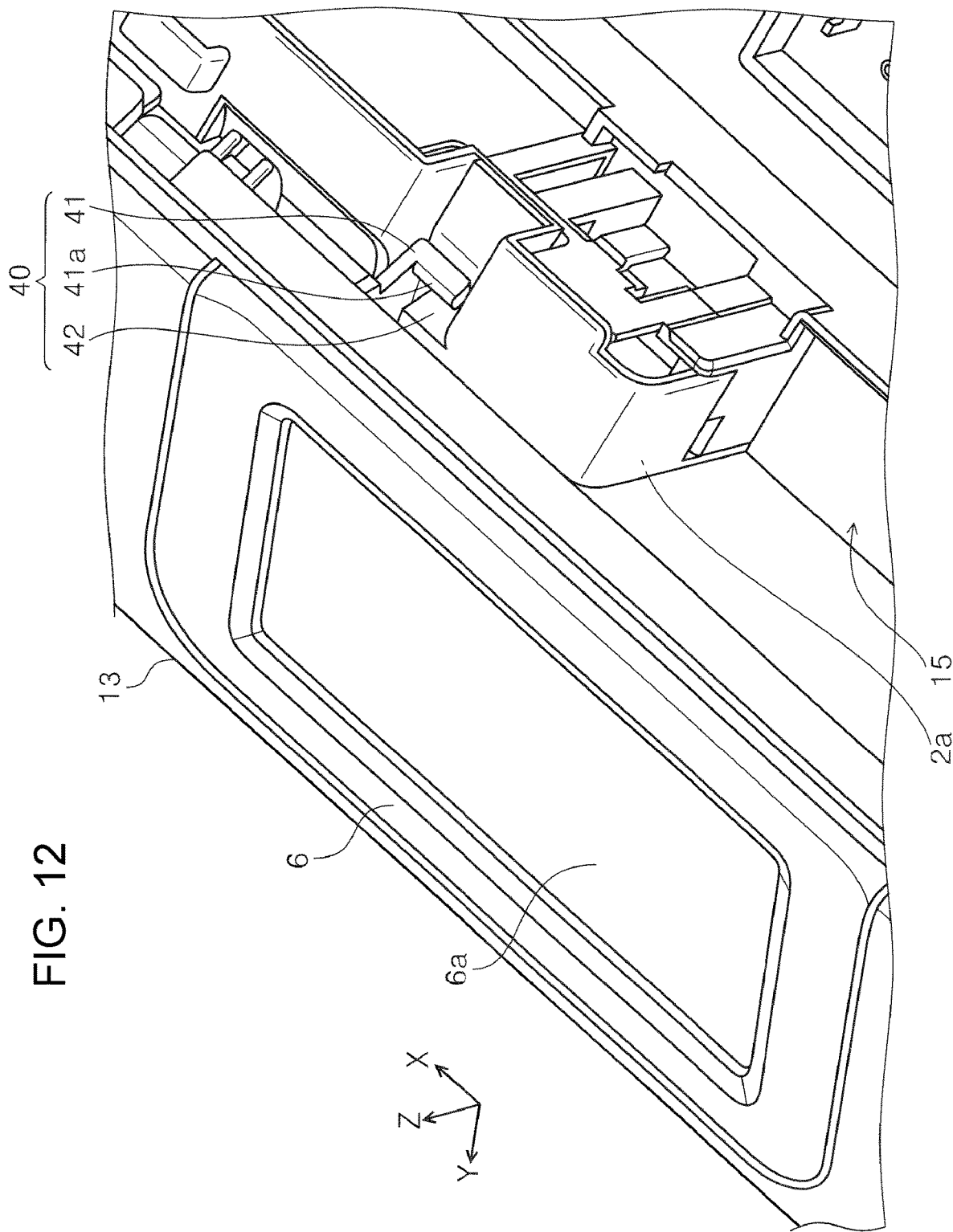
FIG. 12 is a perspective view of the panel unit in the state illustrated in FIG. 7 as viewed from above.
Figure 13:
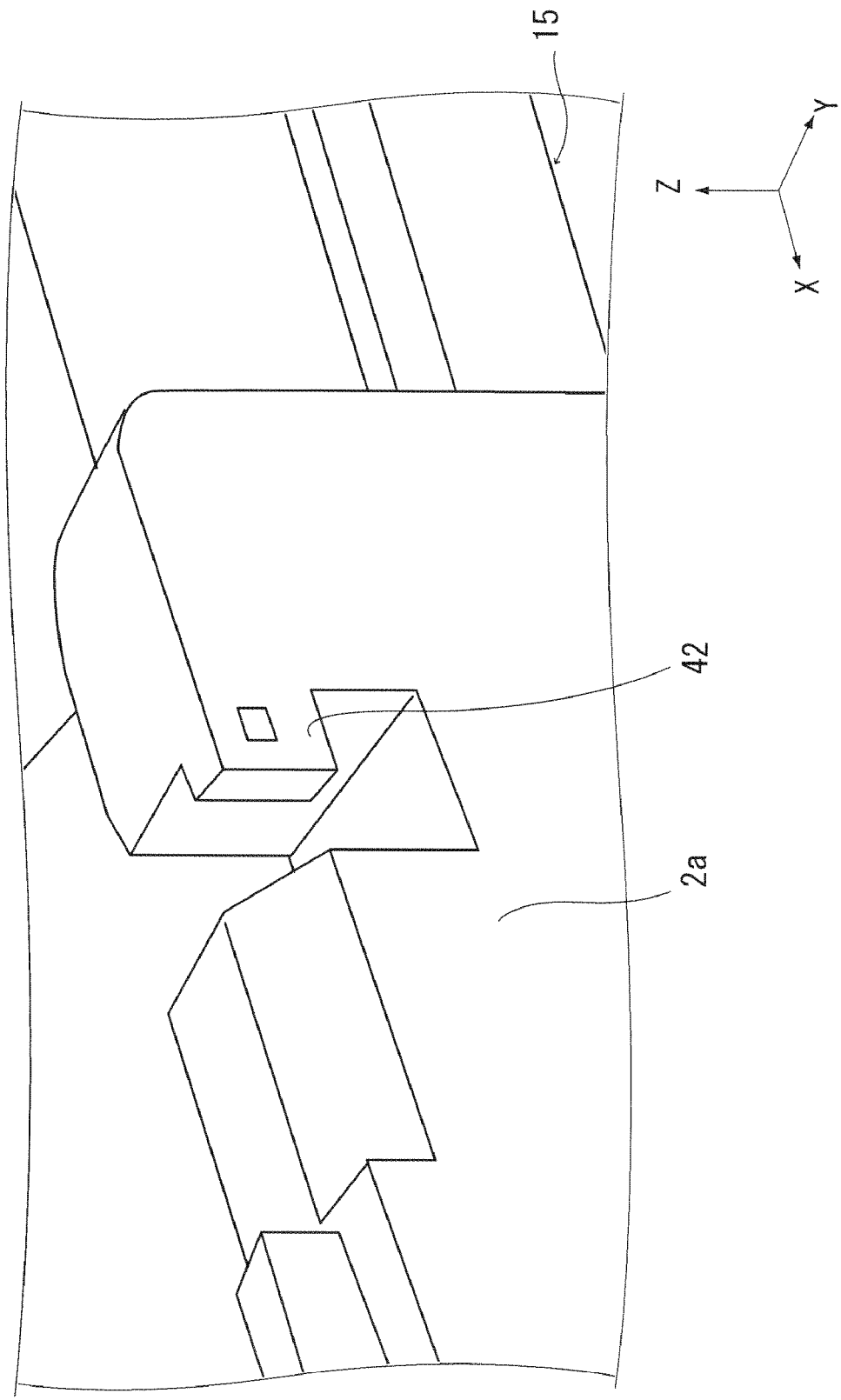
FIG. 13 is an enlarged perspective view of a portion XIII in FIG. 3.

As illustrated in FIGS. 6 to 12, the restrictor 40 of the present embodiment includes a hook portion 41 that is provided in the panel unit 13 and that becomes displaced with pivoting of the panel unit 13, and a restricting portion 42 that is provided in the casing 2 and that restricts pivoting of the scanner unit 4 relative to the casing 2 by engaging with the hook portion 41. In FIGS. 11 and 12, illustration of the scanner unit 4 is omitted for easy understanding of the configuration of the restrictor 40. As illustrated in FIGS. 3 and 13, the restricting portion 42 is provided on the upper portion of the front surface 2a of the casing 2.

Figure 6:
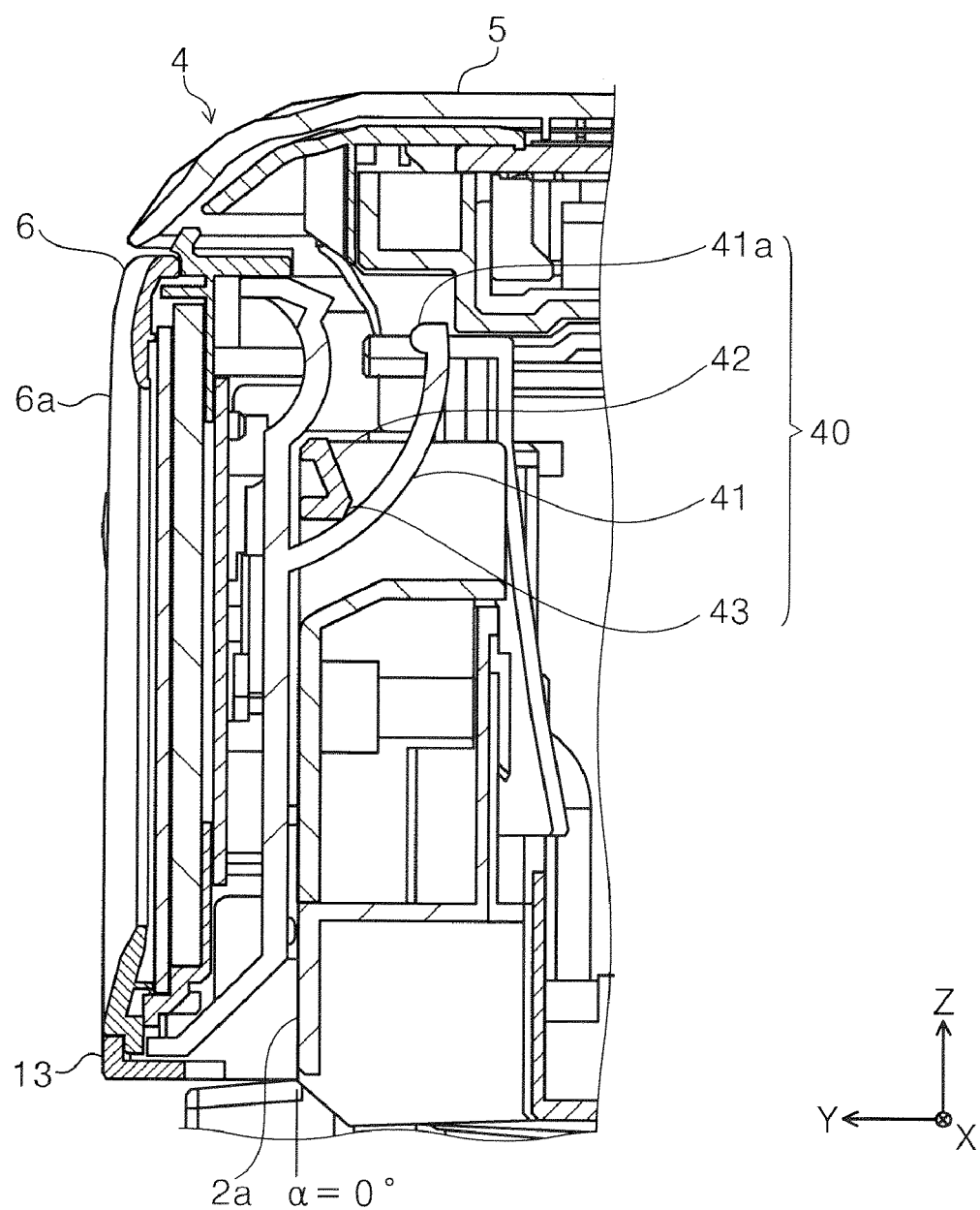
FIG. 6 is a sectional view taken along the line VI-VI in FIG. 1.
Figure 7:
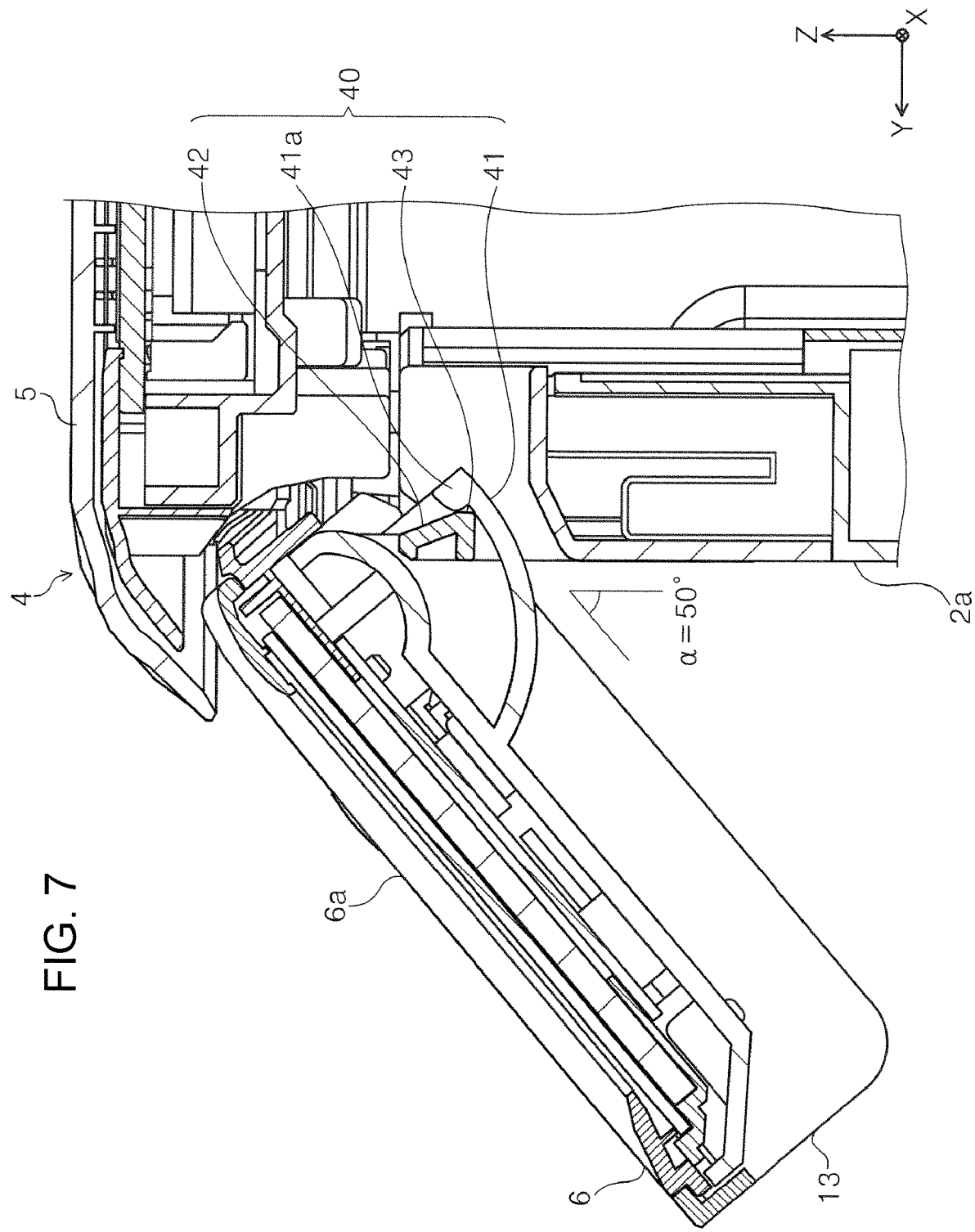
FIG. 7 is a sectional view illustrating a state in which the panel unit has been pivoted by 50° from a first orientation.
Figure 8:
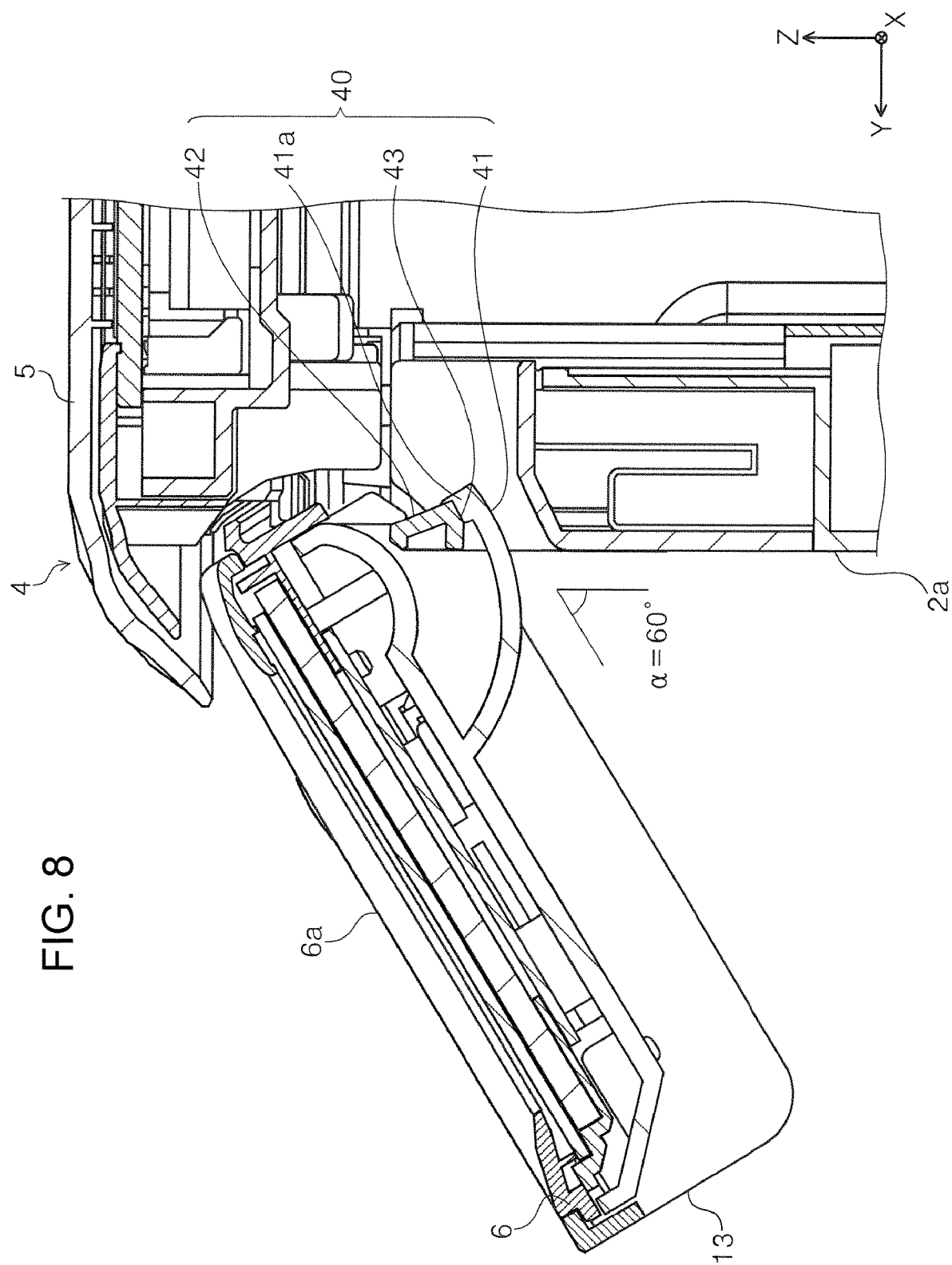
FIG. 8 is a sectional view illustrating a state in which the panel unit has been pivoted 60° from the first orientation.

FIG. 6 is a sectional view taken along the line VI-VI in FIG. 1 where the panel unit 13 is in the first orientation. FIGS. 7 to 10 illustrate a state in which the panel unit 13 is pivoted from the first orientation of the panel unit 13 illustrated in FIG. 6 in a direction in which the operation surface 6a faces upward. With regard to the first orientation of the panel unit 13, FIG. 6 illustrates a state in which the pivot angle α is 0°, FIG. 7 illustrates a state in which the pivot angle α of the panel unit 13 is 50°, FIG. 8 illustrates a state in which the pivot angle α of the panel unit 13 is 60°, FIG. 9 illustrates a state in which the pivot angle α of the panel unit 13 is 70°, and FIG. 10 illustrates a state in which the pivot angle α of the panel unit 13 is 80°.

In the present embodiment, the state in which the pivot angle α of the panel unit 13 illustrated in FIG. 9 is 70° corresponds to the second orientation in which the restrictor 40 is in the free state. In addition, the panel unit 13 is configured to pivot to a third orientation in which the pivot angle α from the first orientation is larger than the second orientation. The state in which the pivot angle α of the panel unit 13 illustrated in FIG. 10 is 80° corresponds to the third orientation.

The restrictor 40 is configured such that the hook portion 41 is engaged with the restricting portion 42 before the panel unit 13 is changed from the first orientation to the second orientation, that is, in the state illustrated in FIGS. 6 to 8, and when the panel unit 13 is in the second orientation, the hook portion 41 is disengaged from the restricting portion 42 as illustrated in FIG. 9. Thus, pivoting of the scanner unit 4 in the opening direction is restricted by the restrictor 40 until the panel unit 13 changes from the first orientation to the second orientation. When the panel unit 13 is in the second orientation, the hook portion 41 is disengaged from the restricting portion 42, so that the restriction by the restrictor 40 is released, and the scanner unit 4 can be opened.

The restricting portion 42 is provided with a leaf spring 43 as a presser that presses the hook portion 41 engaged with the restricting portion 42. As illustrated in FIGS. 6 to 8, it is possible to prevent the panel unit 13 from rattling in a state in which the hook portion 41 is engaged with the restricting portion 42 by the leaf spring 43 pressing the hook portion 41 that is engaged with the restricting portion 42.

In addition, the hook portion 41 includes a projecting portion 41a that interferes with the restricting portion 42 when it is disengaged from the restricting portion 42. The projecting portion 41a is provided at the distal end of the hook portion 41. As illustrated in FIG. 8, when the pivot angle α of the panel unit 13 is around 60°, that is, immediately before the panel unit 13 is in the second orientation, the projecting portion 41a interferes with the restricting portion 42, and torque is generated with pivoting of the panel unit 13. Then, when the pivot angle α of the panel unit 13 is in the second orientation of 70° and the projecting portion 41a is disengaged from the restricting portion 42, a click feeling can be obtained due to the torque generated by the interference between the projecting portion 41a and the restricting portion 42 being eliminated. This click feeling can make it easier for the user to understand that the scanner unit 4 can be pivoted.

Until the panel unit 13 is changed from the first orientation to the second orientation by providing the printer 1 with the restrictor 40 configured as described above, it is possible to suppress the scanner unit 4 from being pivoted first by a force for pivoting the panel unit 13 upward.

In addition, because the panel unit 13 is pivoted to switch between the restricted state and the free state of the restrictor 40, there is no need to separately provide a lever or handle for switching the state of the restrictor 40, and the number of elements forming the printer 1 can be reduced.

In addition, by forming the restrictor 40 with the hook portion 41 and the restricting portion 42, the restrictor 40 can be provided with a simple configuration.

Modification of Restrictor

Figure 14:
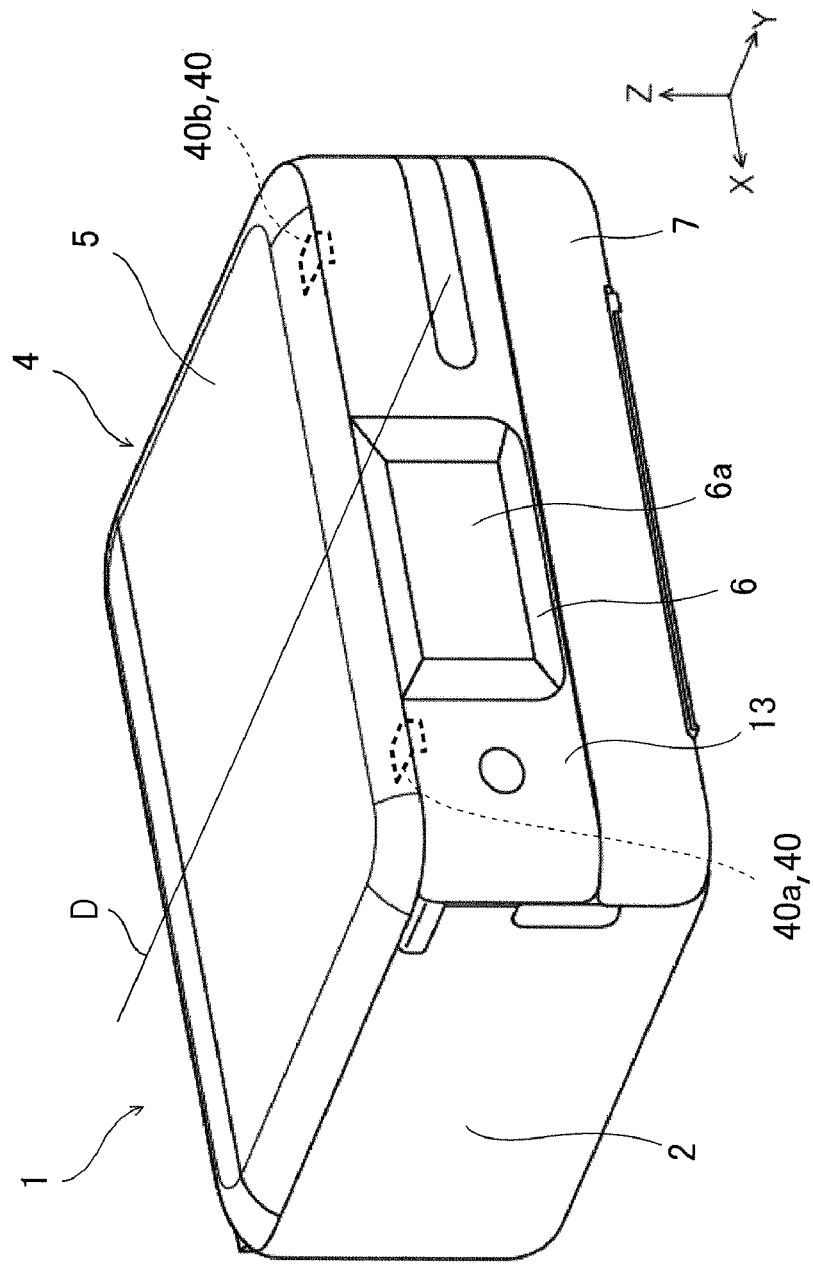
FIG. 14 is a perspective view for explaining a modification of a restrictor.

As illustrated in FIG. 14, the printer 1 may be configured to include a plurality of restrictors 40. In FIG. 14, the plurality of restrictors 40 includes a first restrictor 40a and a second restrictor 40b. The first restrictor 40a and the second restrictor 40b are disposed with a space therebetween in the width direction (X-axis direction) with respect to the panel unit 13. The first restrictor 40a and the second restrictor 40b are provided on both sides of the center D of the panel unit 13 in the width direction. By providing the plurality of restrictors 40, it is possible to more reliably suppress the scanner unit 4 from pivoting first with a force for pivoting the panel unit 13 upward.

In addition, the restrictor 40 is not limited to the configuration including the hook portion 41 and the restricting portion 42, for example, the restrictor may include a locking pin that advances and retracts with respect to a hole provided in the scanner unit, a solenoid that advances and retracts the locking pin, and a control portion that controls the solenoid. In addition, it can be configured so as to include an encoder that detects the opening angle of a panel unit. The control portion engages and locks the lock pin in the hole of the scanner unit until the panel unit is in the second orientation, and the control portion is in the restricted state. When in the second orientation, the locking pin is removed from the hole to release the lock, and the free state is set.

Panel Unit

The third orientation of the panel unit can be set so as to satisfy the following relationship with the opening angle of the scanner unit 4.

Figure 19:
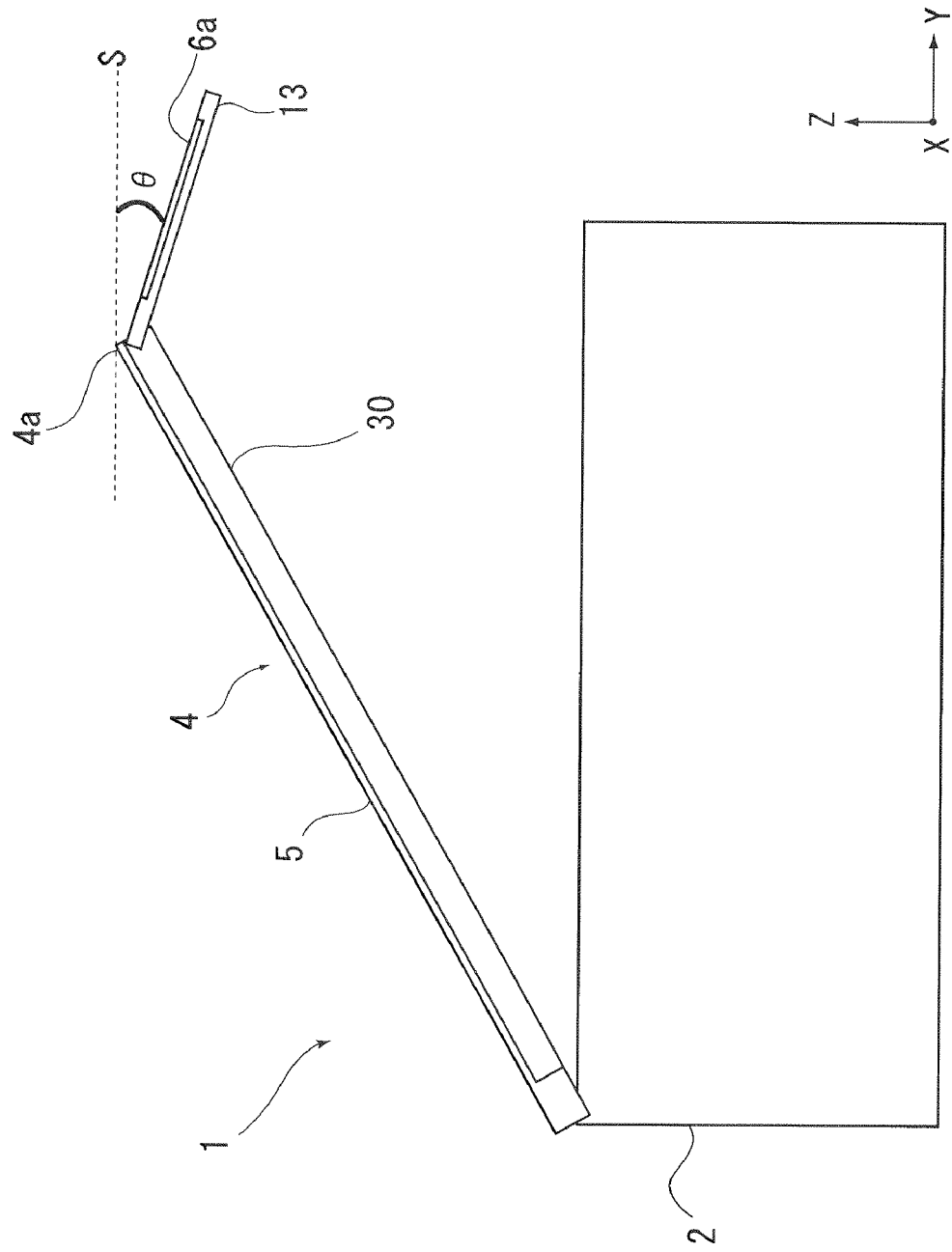
FIG. 19 is a diagram for explaining an example of a relationship between a third orientation of the panel unit and a completely open opening angle of the scanner unit.

As illustrated in FIG. 19, the printer 1 can be configured such that, when the panel unit 13 is in the third orientation and the scanner unit 4 is at the maximum opening angle, the operation surface 6a (panel surface) faces toward the apparatus front side so as to be tilted from the horizontal. That is, the angle θ illustrated in FIG. 19 can be configured to be larger than 0°. Further, in FIG. 19, the horizontal plane is indicated by a dotted line with a symbol S.

With this configuration, when the scanner unit 4 is completely opened, the operation surface 6a can be easily viewed from the apparatus front side.

Liquid Housing Portion

In the printer 1, it is possible to replenish the ink consumed by recording in the liquid housing portion 24 mounted on the carriage 20 illustrated in FIG. 3.

The printer 1 is configured to be able to replenish ink in the liquid housing portion 24 in a state in which the scanner unit 4 is open as illustrated in FIG. 3.

Since the printer 1 includes the restrictor 40 described above, the scanner unit 4 can be switched between the restricted state and the free state by changing the orientation of the panel unit 13, thus, when replenishing ink into the liquid housing portion 24, the scanner unit 4 can be opened with good operability.

Figure 16:
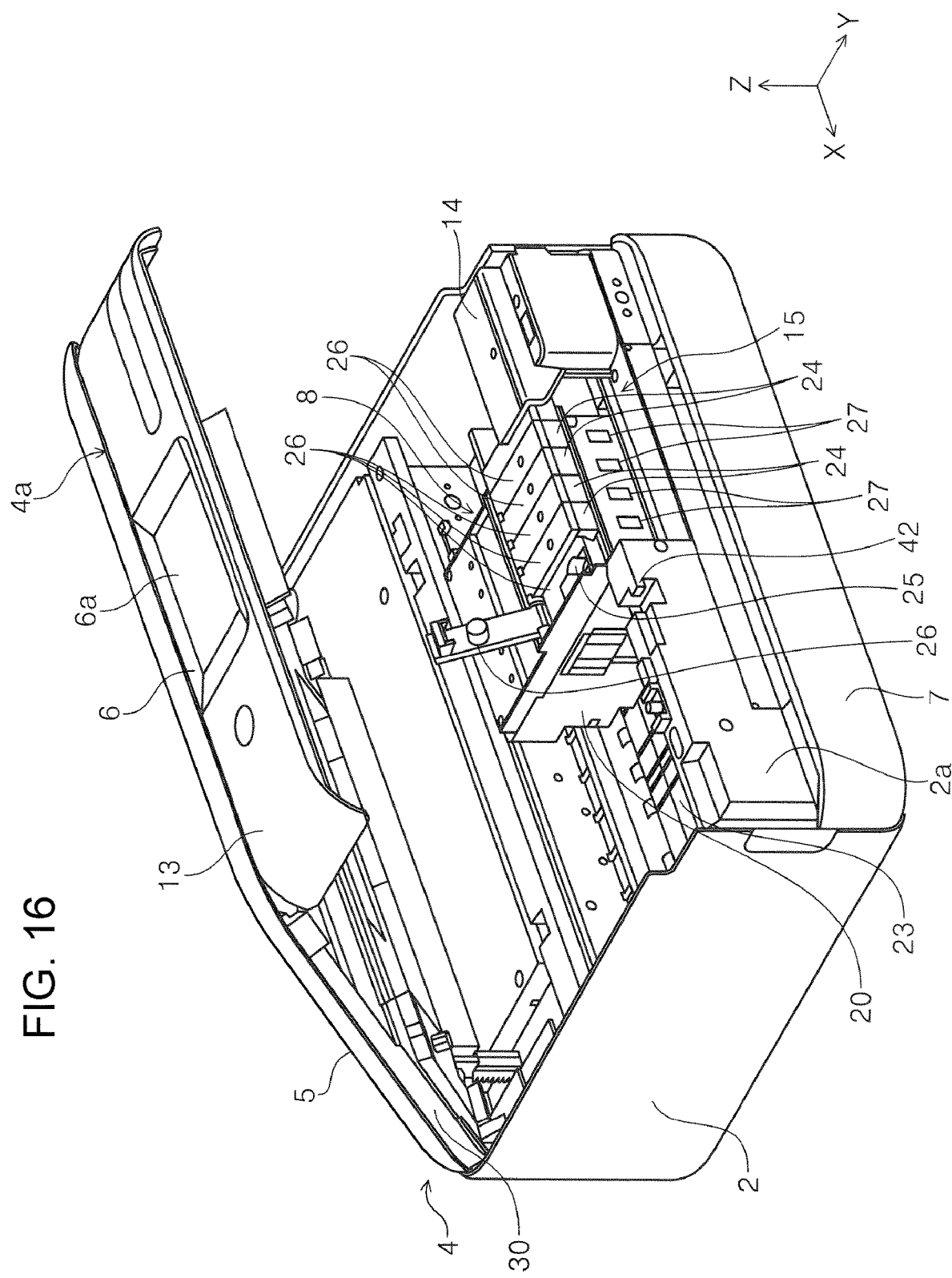
FIG. 16 is a perspective view illustrating a state in which a cap of the liquid housing portion has been opened.

A plurality of liquid housing portions 24 corresponding to a plurality of colors are mounted on the carriage 20. A cap 26 that closes an ink supply port 25 illustrated in FIG. 16 is provided on the upper portion of each liquid housing portion 24. FIG. 16 illustrates a state in which the cap 26 of the leftmost liquid housing portion 24 is open when the drawing is viewed from the front. The cap 26 opens and closes the ink supply port 25 by pivoting about the apparatus rear side (–Y direction) serving as a pivot shaft. Ink can be injected into the liquid housing portion 24 from the ink supply port 25.

In FIG. 3, the carriage 20 is located at a home position. The home position is provided at one end of the moving area of the carriage 20, and is set at the end in the –X direction in this embodiment.

An eaves member 14 is provided in front of the casing 2 in the –X direction, and, when the carriage 20 is located at the home position, the liquid housing portions 24 with the caps 26 closed are located so as to be below the eaves member 14.

Because the eaves member 14 is provided, the caps 26 of the liquid housing portions 24 cannot be opened when the carriage 20 is located at the home position. When ink is replenished to the liquid housing portions 24, for example, by selecting the ink replenishment mode in the operation portion 6, as illustrated in FIG. 15, the carriage 20 can be moved to a position where the caps 26 are not covered by the eaves member 14.

In the present embodiment, a notch 15 is provided on the front surface 2a of the casing 2.

Figure 15:
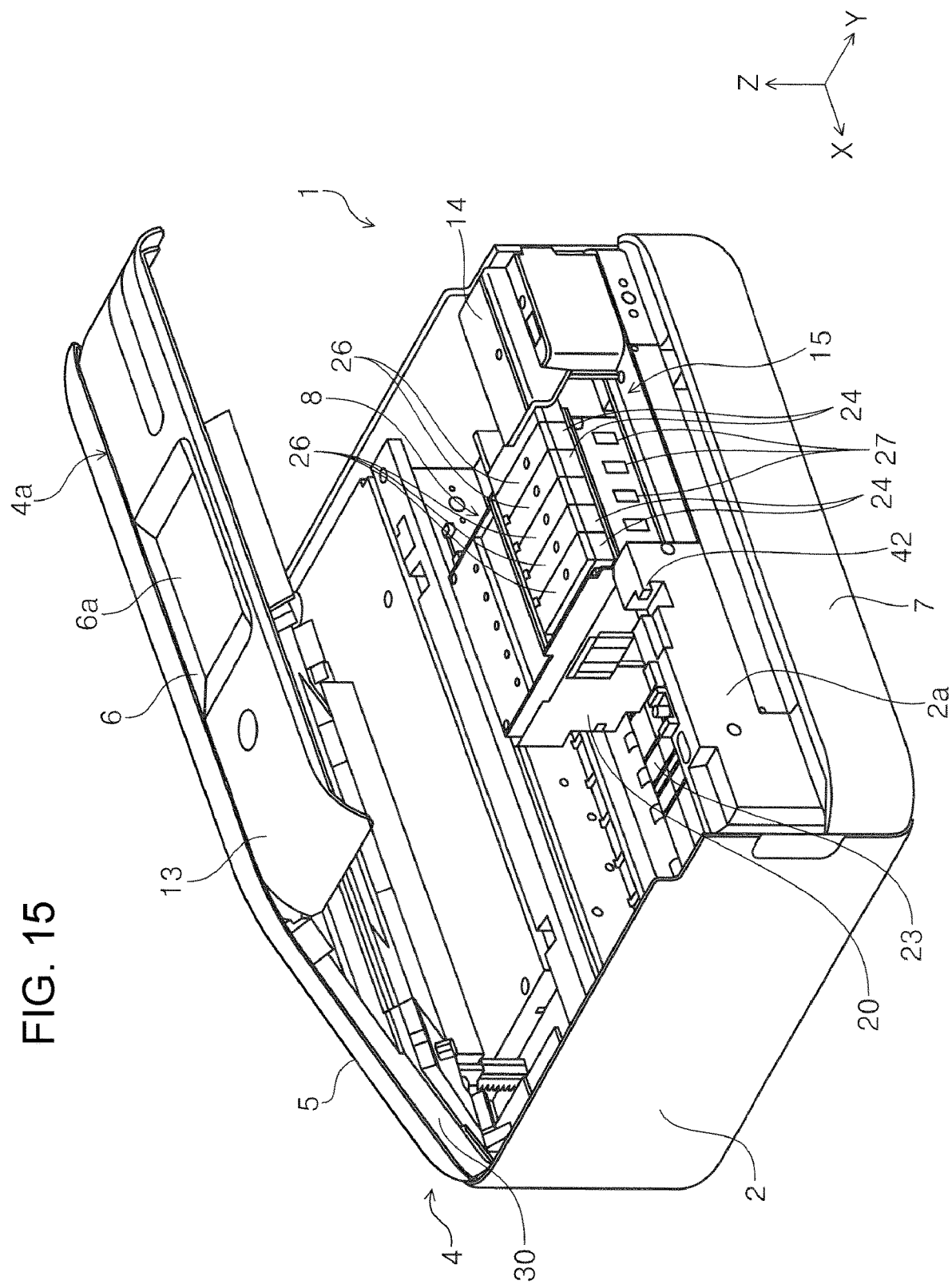
FIG. 15 is a perspective view illustrating a state in which a carriage of the printer according to the first embodiment has been moved to a position at which ink is replenished to a liquid housing portion.

On the +Y direction side surface of each of the liquid housing portions 24, a window portion 27 is provided so that the amount of ink inside can be viewed, and as illustrated in FIG. 15, in the ink replenishment mode, the carriage 20 is moved to a position where it overlaps the notch 15 in the X-axis direction. Thus, ink can be replenished while checking the amount of ink in each of the liquid housing portions 24. When the panel unit 13 is opened, the notch 15 can be seen, and the ink amount can be visually recognized in the ink replenishment mode.

When the ink replenishment is completed, for example, the carriage 20 can be returned to the home position by ending the ink replenishment mode in, for example, the operation portion 6. In addition, it is possible to detect that the scanner unit 4 is closed with respect to the casing 2 and to return the carriage 20 to the home position using this as a trigger.

The eaves member 14 reduces the likelihood of forgetting to close the caps 26 after the ink has been replenished to the liquid housing portions 24. As described above, when the caps 26 of the liquid housing portions 24 are completely closed, the liquid housing portions 24 are located below the eaves member 14 when the carriage 20 returns to the home position.

Figure 17:
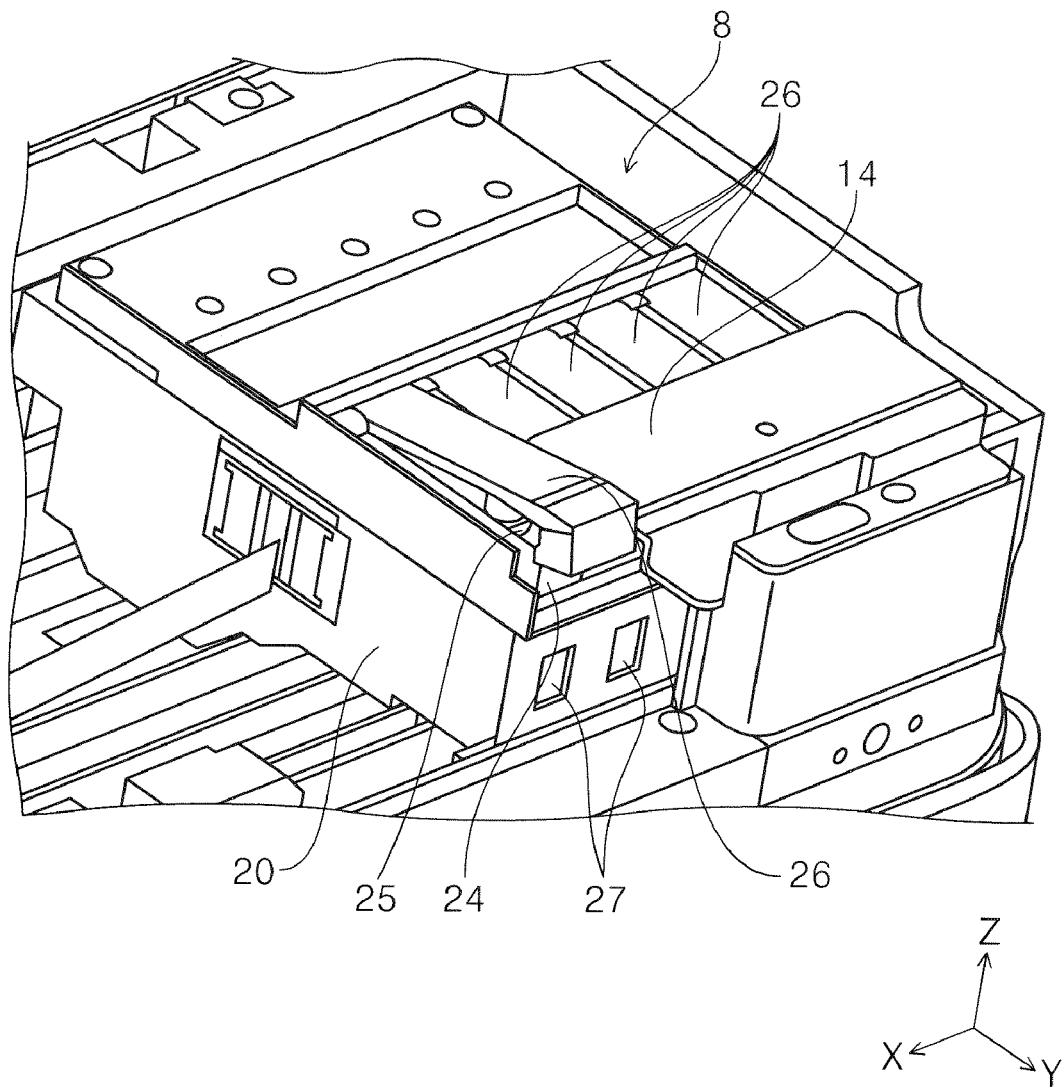
FIG. 17 is a perspective view illustrating an eaves member.
Figure 18:
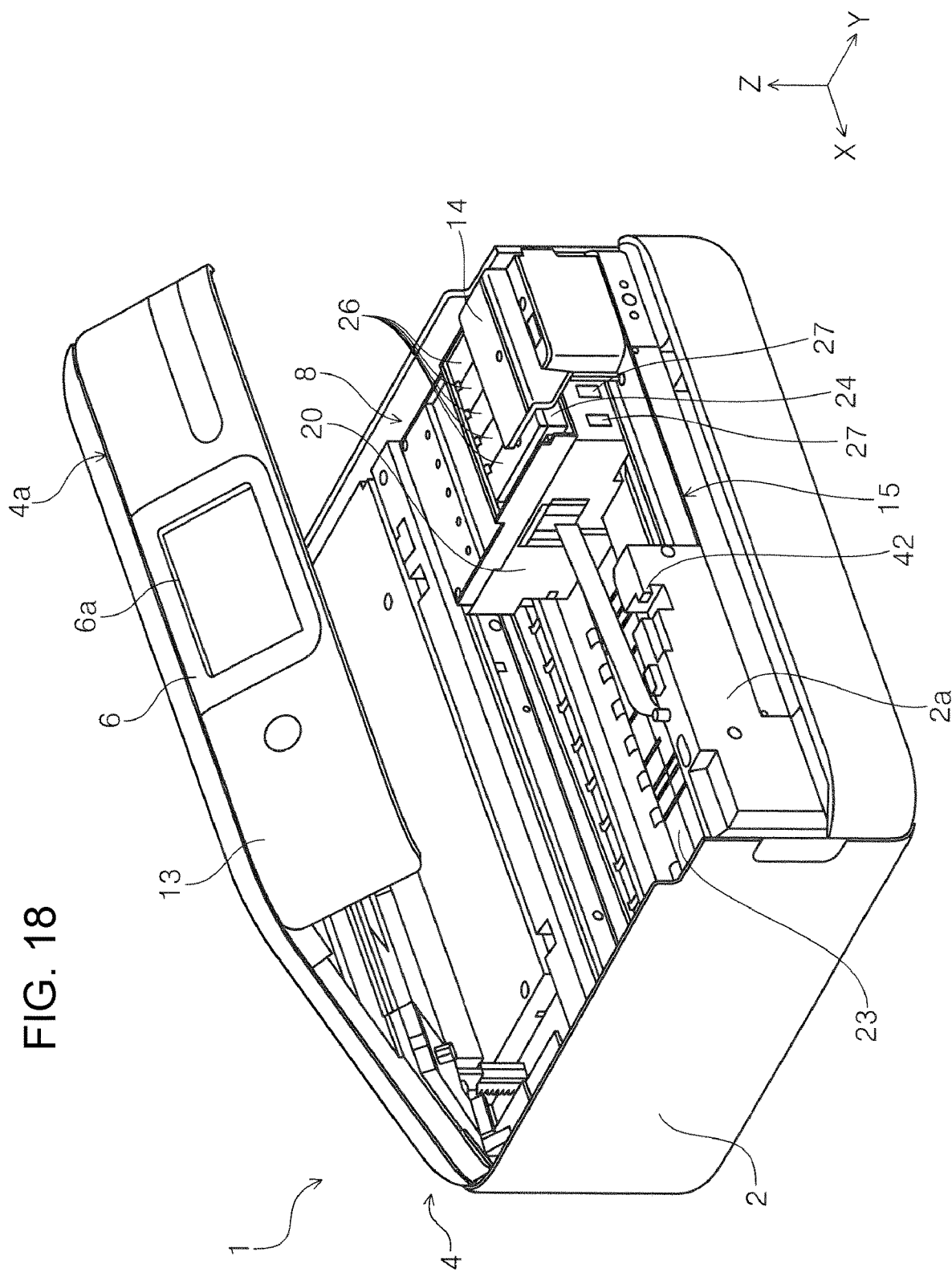
FIG. 18 is a perspective view illustrating a state in which the panel unit is at the same angle as the first orientation with the scanner unit in a completely open state.

As illustrated in FIG. 17, when any of the caps 26 is in a half-open state, the cap 26 is caught by the eaves member 14, and the carriage 20 cannot return to the home position. Therefore, for example, when the carriage 20 has not returned to the home position, an alert can be issued to notify that the cap 26 may be opened halfway. In addition, it is possible to detect a load on a carriage motor (not illustrated) caused by the cap 26 being caught on the eaves member 14 and to issue an alert when the load is equal to or higher than a predetermined value.

In addition, it goes without saying that the present disclosure is not limited to the above embodiment, and various modifications are possible within the scope of the disclosure described in the claims, and they are also included in the scope of the present disclosure.

What is claimed is:

1. A recording apparatus comprising:
a recording portion that records on a medium;
a casing provided with the recording portion in the casing;
a scanner unit provided so as to pivot with respect to the casing and configured to open and close an upper portion of the casing by pivoting;
a panel unit that is provided on the scanner unit, and that, when the scanner unit is in a closed state in which the scanner unit is closed with respect to the casing, is configured to pivot from a first orientation where a panel surface is along a side surface of the casing toward a direction in which the panel surface faces upward compared with the first orientation; and
at least one restrictor that is configured to switch between a restricted state that restricts the scanner unit from pivoting in an opening direction from the closed state in which the scanner unit is closed with respect to the casing, and a free state that allows the scanner unit to pivot in the opening direction from the closed state, and that enters the restricted state when the panel unit is set to the first orientation and enters the free state when the panel unit in the first orientation pivots by a predetermined angle to be in a second orientation.

2. The recording apparatus according to claim 1, wherein the panel unit is provided at a free end of the scanner unit.

3. The recording apparatus according to claim 2, wherein the panel unit is configured to pivot until the panel unit takes a third orientation in which a pivot angle from the first orientation is larger than a pivot angle of the second orientation from the first orientation, and
in a state in which the panel unit is in the third orientation when a direction in which the free end of the scanner unit is positioned is treated as an apparatus front side, and, in a case where the scanner unit is set to a maximum opening angle, the panel surface faces toward the apparatus front side so as to be tilted from horizontal.

4. The recording apparatus according to claim 1, wherein the restrictor includes
a hook portion that is provided in the panel unit and that becomes displaced with pivoting of the panel unit and
a restricting portion that is provided in the casing and that restricts pivoting of the scanner unit relative to the casing by engaging with the hook portion, and
before the panel unit is changed from the first orientation to the second orientation, the hook portion is engaged with the restricting portion and the restrictor enters the restricted state, and when the panel unit is in the second orientation, the hook portion is disengaged from the restricting portion, and the restrictor enters the free state.

5. The recording apparatus according to claim 4, wherein the hook portion includes a projecting portion that interferes with the restricting portion when the hook portion is disengaged from the restricting portion.

6. The recording apparatus according claim 4, further comprising:
a presser that is provided on the restricting portion, and that presses against the hook portion engaged with the restricting portion.

7. The recording apparatus according to claim 1, wherein the restrictor is provided in a plurality.

8. The recording apparatus according to claim 1, wherein the recording portion includes a recording head that ejects liquid, and is configured to perform recording by ejecting the liquid from the recording head toward the medium,
the casing is provided with, in the casing, a liquid housing portion that houses the liquid, and
in a state in which the scanner unit is open, the liquid housing portion is configured to be replenished with the liquid.

9. The recording apparatus according to claim 8, wherein the recording portion is provided with a carriage that supports the recording head and that is configured to mount the liquid housing portion.

10. The recording apparatus according to claim 1, wherein when the panel unit is opened, a notch can be seen, and an ink amount can be visually recognized in an ink replenishment mode.

* * * * *